United States Patent Office 3,520,241
Patented July 14, 1970

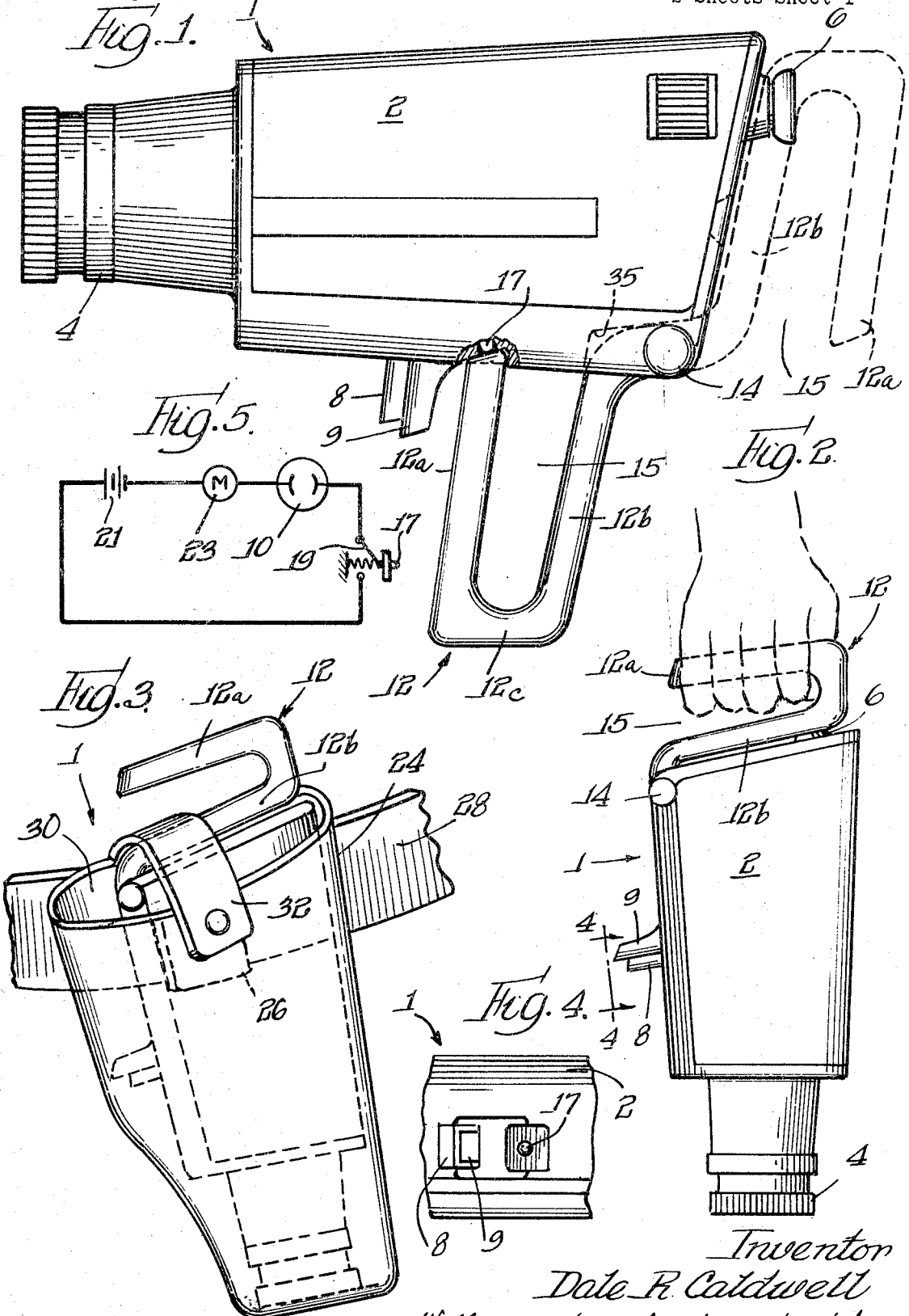

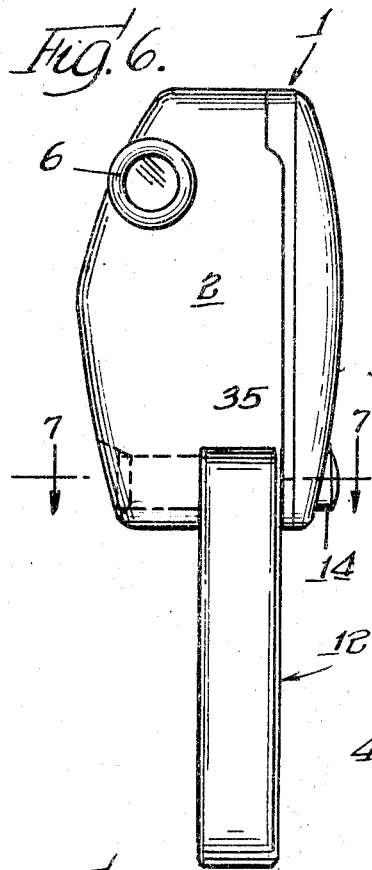
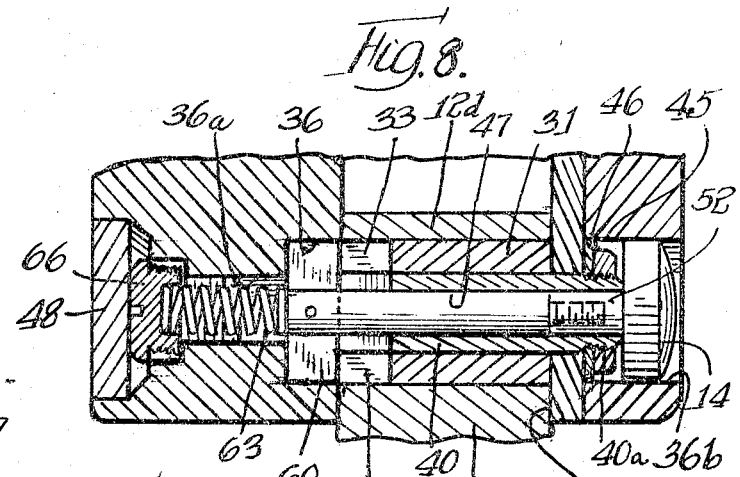
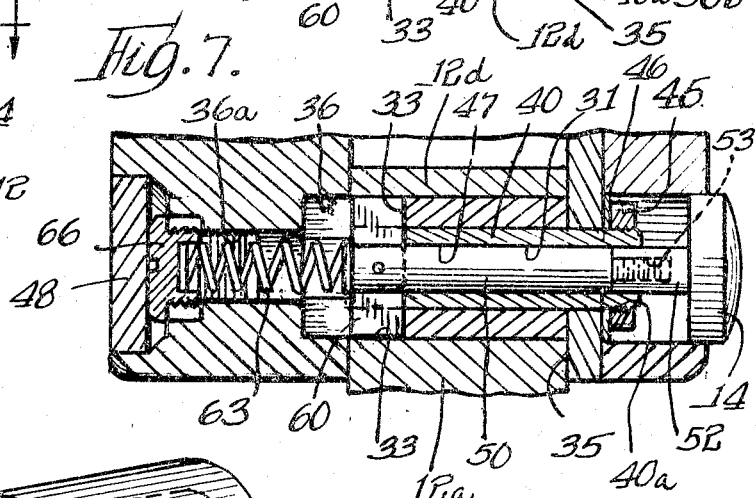
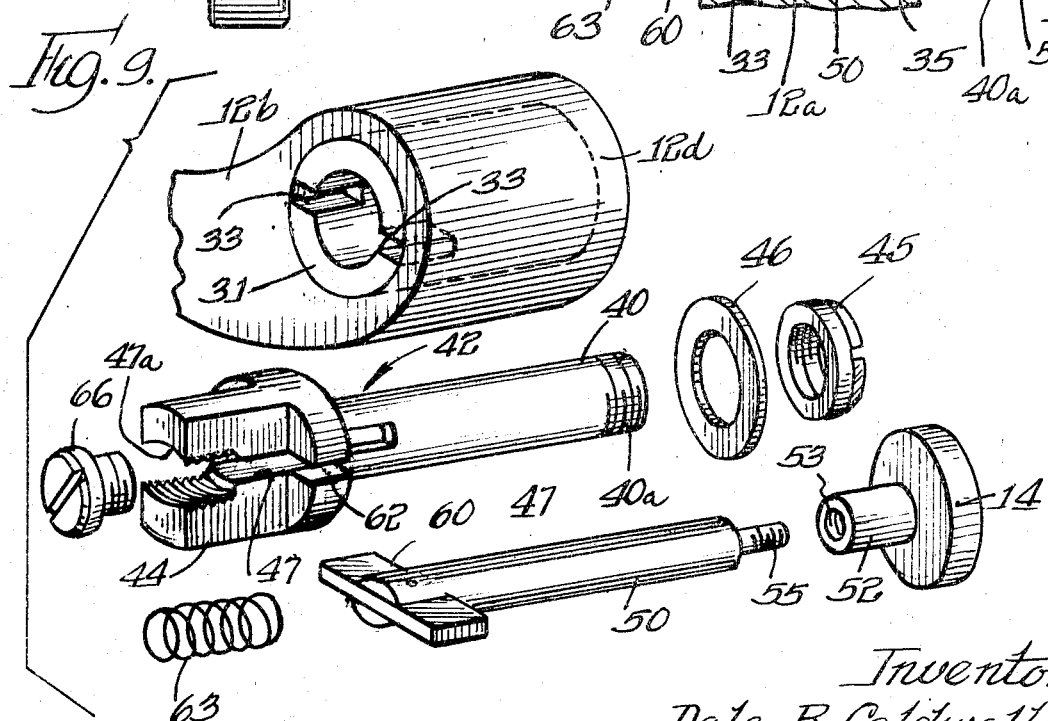

3,520,241
PISTOL GRIP MOVIE CAMERA
Dale R. Caldwell, Evanston, Ill., assignor to Argus Incorporated, Chicago, Ill., a corporation of Delaware
Filed July 27, 1967, Ser. No. 656,563
Int. Cl. G03b 17/56
U.S. Cl. 95—86
9 Claims

ABSTRACT OF THE DISCLOSURE

A movie camera is provided having a U-shaped pistol grip handle pivotally mounted from an inoperative position where it projects rearwardly from the rear of the camera housing to an operative position extending transversely downwardly from the housing. In the inoperative position of the piston grip handle, the operator can pass his fingers between the arms of the U-shaped handle for carrying the same or for inserting the same into a holster-like casing. When the camera is in the casing, the pistol grip handle projects from the top of the casing so that it can be readily grasped to remove the camera therefrom. The pistol grip handle automatically is locked in position when it is moved into its operative or inoperative position. The pistol grip handle is released from either of these positions so it can be pivoted into the other position by depression of a lock release member.

---

This invention relates to a movie camera of the type having a pistol grip handle which is pivotally mounted on the camera housing for movement between an inoperative position where it is at the rear of the housing and an operative position where it extends transversely downwardly from the bottom of the housing. The pistol grip handle is mounted for pivotable movement in this manner so the camera housing and the pistol grip handle forms a compact assembly when the camera is not in use.

The present invention is an improvement in the pistol grip camera described above in that the handle has an aperture for receiving the user's hand so that it serves as a carrying handle for the camera in its inoperative position. In the preferred form of the invention, the pistol grip is a U-shaped member which is in an up-side-down position in its operative position at the rear of the camera housing and is pivotable 180 degrees into its operative position beneath the camera.

In accordance with a further feature of the invention, the camera described is carried in a holster-like case which can be attached to the belt of the user. The holster-like case has an opening at the top thereof which is adapted to receive the camera housing with the normally front end portion thereof facing downwardly and the handle in its inoperative position projecting upwardly at the top of the casing where it can be easily grasped to be pulled from the case. Most advantageously, the holster-like case includes a strap which passes between the parallel arms of the U-shaped pistol grip handle in the preferred form of the invention and releasably engages fastening means on the sides of the holster-like case.

A still further feature of the invention is the provision in a photocell controlled camera of a means for automatically deenergizing the control circuit in which the photocell or the other light responsive element is located when the pistol grip handle is moved into its inoperative position. The control circuit for such a camera often includes a battery in series with a lens diaphragm controlling meter movement and a light responsive cell. To prevent the useless discharge of the battery when the camera is not in use, the present invention provides a switch for de-energizing the circuit automatically when the pistol grip handle is moved into its inoperative position. In cameras heretofore constructed supplied with a switch for de-energizing the diaphragm control circuit, the operator usually had to move an "automatic-manual" control member into a "manual" position. Frequently the user failed to move the control member to the "manual" position where the control circuit is de-energized with the result that the battery discharged more quickly and the meter movement was usually in an intermediate position where it was free to be moved suddenly by ordinary vibration against one of the limit stops thereof which could cause damage to the meter movement. In the feature of the invention just described, this problem is alleviated or minimized because, when the camera is not in use and the pistol grip handle is in its inoperative position, the control circuit is automatically de-energized so the normally spring biased meter movement is pulled against one of the limit stops where ordinary vibration will not cause any relative movement between the movement and the stop.

The above and other aspects of the invention will become apparent upon making reference to the specification to follow, the claims and the drawings wherein:

FIG. 1 is a view of a camera incorporating the features of the present invention with the pistol grip handle thereof in an operative picture taking position;

FIG. 2 is a view of the camera shown in FIG. 1 with the pistol grip handle thereof rotated into its inoperative position and the camera carried in a vertical position;

FIG. 3 is a view of the camera shown in FIG. 2 carried within a holster-like case;

FIG. 4 is a fragmentary view of the portion of the camera shown in FIG. 2, as seen along viewing plane 4—4 in FIG. 2;

FIG. 5 illustrates an exemplary control circuit which is respectively energized and de-energized upon the movement of the pistol grip handle between its operative and inoperative positions;

FIG. 6 is a rear view of the camera shown in FIG. 1 when the pistol grip handle is in its operative position;

FIG. 7 is a greatly enlarged horizontal sectional view through the pistol grip handle lock assembly, as seen along section lines 7—7 in FIG. 6;

FIG. 8 is a sectional view corresponding to FIG. 7 when the release button forming part of the lock assembly is depressed to enable the pistol grip handle to be pivoted between its extreme positions; and FIG. 9 is an exploded view of the different elements making up the lock assembly shown in FIGS. 7 and 8.

The camera 1 shown in FIGS. 1 and 2 includes a housing 2 having at the front end thereof a lens barrel assembly 4, at the rear end thereof an eye piece 6 and projecting downwardly from the central portion of the bottom of the housing a film feeding and shutter control lever 8 projecting from a stationary guard 9 at the rear thereof. The lever 8 is spring urged into the position shown and is movable rearwardly against the spring tension to close a switch (not shown) which effects energization of a motor which drives the film feeding and shutter mechanism (not shown). The opening of the lens barrel assembly 4 can be controlled by a diaphragm assembly (not shown) which may be of conventional construction and whose position is determined by the amount of light passing through the lens barrel assembly 4 and striking a light responsive cell 10 (FIG. 5). (Although for certain aspects of the invention it is not necessary that the camera have a light controlled diaphragm assembly, one of the aspects of the invention to be described relates to this portion of the camera.)

The present invention relates primarily to the design of a pistol grip handle generally indicated by reference numeral 12 which is mounted for pivotal movement about a pivot axis at the center of a depressible button 14 between the operating position shown in FIG. 1, where the handle extending generally transversely downwardly from the bottom of the housing 2, and an inoperative in-line position with the housing 2, where the handle projects rearwardly from the rear end of the housing 2. In the most advantageous form of the invention as illustrated, the pistol grip handle 12 is a U-shaped member having two generally parallel extending legs 12a and 12b interconnected by a bridging section 12c. In the inoperative position of the U-shaped handle 12, the handle is in an up-side-down position with the camera oriented horizontally as shown in FIG. 1. An important unique aspect of the invention is in the shape of the pistol grip handle 12 which provides an aperture or opening 15 defined between the handle arms 12a and 12b through which the user's hand can readily extend to grasp the outermost arm 12a as shown in FIG. 2 where the camera conveniently hangs vertically downwardly from the user's hand in a comfortable carrying position. The handle 12 is firmly locked into the inoperative position by locking means which preferably has the construction shown in FIGS. 7 through 9 to be described.

When the user desires to take a picture, he depresses the release button 14 which unlocks the handle 12 permitting it readily to be pivoted 180 degrees approximately into its operative position shown in FIG. 1 where the handle snaps into a locked position. In this position, the pistol grip handle 12 is used in a more or less conventional way where the user grasps the handle 12 in the palm of his hand and extends his index finger horizontally around the control lever 8. It is preferred that the center of gravity of the camera be positioned above the pistol grip handle 12 so that the camera is in a relatively balanced position when the handle is gripped in the operative position shown in FIG. 1.

In most movie cameras having a pistol grip handle, the film feeding and shutter control lever 8 is on the front of the camera housing. As indicated in the preferred form of the invention, the control lever 8 is positioned on the bottom of the housing 2 where it projects downwardly from the housing in front of the pistol grip 12 where the index finger of the user extends forwardly in a comfortable gripping position analogous to the manner in which the handle and trigger of a pistol are gripped.

The pistol grip handle 12 can be returned to its inoperative position by again depressing the release button 14 and swinging the handle to the rear of the carrier housing where the handle again automatically snaps into a locked position.

Another feature of the present invention which makes the camera 1 very convenient to use is the positioning of a switch operating button 17 on the camera housing bottom so the button is depressed by the end of the handle arm 12a when the handle 12 is moved into its operative position in the preferred form of the invention. The depression of the switch operating button 17 closes a normally open switch (FIG. 5) to complete a series control circuit including a battery 21, a meter movement 23 which controls the positioning of the aforementioned diaphragm assembly and the light responsive cell 10. Many movie cameras are provided with a manually operable switch which opens the control circuit to the meter movement 23 on "manual" operation so the battery 21 does not wear out when the automatic control of the diaphragm assembly is not desired. In the present invention, this opening of the control circuit is effected automatically when the handle 12 is moved to its inoperative position. In this position, the switch operating button 17 is undepressed so that the switch 19 is open to de-energize the control circuit of the meter movement 23. It is apparent that, when the handle 12 is in its inoperative position at the rear of the housing 2, the camera is not usable as a practical matter.

The shape of the pistol grip handle 12 cooperates with another feature of the invention, namely the provision of a holster-like casing 24 (FIG. 3) which would normally hold the camera 1 when not in use. Although the casing 24 is not necessary because the camera can be conveniently carried in the position shown in FIG. 2, the casing 24 is of great convenience where the user must carry the camera for a long while and he desires to have both of his hands free.

Although the holster-like casing 24 may take a variety of forms, as illustrated it has a loop 26 for securing the same to the user's belt 28. The casing 24 has an open top 30 into which the normally front end portion of the camera including the lens barrel assembly 4 can be readily passed into the interior of the casing when a securing strap 32 at the top of the casing is in its released position. When the camera 1 is fully inserted within the casing 24, the apertured pistol grip handle 12 projects upwardly from the top of the casing where it is readily accessible to the user. The camera is secured within the casing by the aforementioned strap 32 which passes over the inner handle arm 12b and connects with a fastener on the side of the casing 24. In this position, the camera 1 cannot be lifted out of the camera housing 24 unless the strap 32 is released.

Although, as indicated above, the means for locking the pistol grip 12 may take a variety of forms, the construction of the lock assembly of FIGS. 7–9 is preferred. The lock assembly there shown will include a cylindrical sleeve 31 which is fixedly attached to the hollow inner end portion 12d of the arm 12b of the pistol grip handle 12. The sleeve 31 has at one end thereof a pair of slots 33—33 cut in the end of the sleeve and spaced 180 degrees apart. The inner end portion 12d of the handle is pivotally mounted within a recess 35 formed in the bottom and rear of the camera housing 2, as viewed in FIG. 1. The housing has a transverse bore 36 extending completely through the housing 2 an intersecting the recess 35. Supported within the bore 36 are the various components shown in FIGS. 7 through 9 which cooperate with the slotted sleeve 31 to lock the same in either of two diammetrically opposed positions in which the handle 12 is respectively in the aforesaid operative and inoperative positions.

The sleeve 31 is rotatably mounted around the shank 40 of an elongated member 42 having a non-circular head portion 44 which fits into a correspondingly shaped portion 36a of the housing bore 36. The member 42 is anchored in place within the housing bore 36 by means including a nut 45 which bears upon a washer 46 and threads around the projecting threaded end portion 40a of the shank 40 of the member 42. The member 42 has a bore 47 which extends for the full length thereof and slidably receives at one end of the bore the shank portion 52 of the release button 14 which shank portion has a threaded bore 53 which enables the same to be threaded over the neck portion 55 at one end of a rod 50 which is also slidably received in the bore 47. One end of the housing bore 36 has a plug 48 and the other end 36b of the bore 36 is open to expose the end of the release button 14. The other end of the rod 50 has a transversely extending locking bar 60 which is slidable within an axial slot 62 provided in the member 42 which intersects the bore 47. The bore 47 has an enlarged threaded end 47a in the head portion 44 of the member 42. The rod 50 is urged to the right as viewed in FIGS. 7 and 8 by a coil spring 63 carried within the bore 47 of the member 42. The spring 63 is compressed between a cap screw 66 threaded within the threaded end 47a of the bore 47 as shown in FIG. 7, the spring 63 normally urges the locking bar 60 on the end of the rod 50 into the slots 33—33 of the sleeve 31 of the pistol grip handle 12 to hold the same against rotation. When the release button 14 is manually depressed (FIG. 8), the locking bar 50 is moved out of the sleeve slots 33—33, thereby permitting the sleeve 31 and the handle 12 in which it is mounted to be pivoted. When the button 14 is released and the handle 12 reached the opposite extreme position where it abuts either the rear or bottom of the housing 2, the locking bar 60 re-enters the slot 33—33 of the sleeve 31, thereby once again locking the handle in the latter extreme position.

It should be understood that numerous modifications may be made in the most preferred form of the invention described above without deviating from the broader aspects of the invention.

I claim:

1. A movie camera including a housing with a front end having a camera lens assembly oriented with its axis extending forwardly of the housing and a handle-forming member pivotally mounted on the housing mounted for movement between an inoperative position at the rear of the housing where the handle-forming member projects rearwardly of the housing where it forms a handle which can be grasped for carrying the same when the camera is not in use and an operative position where the handle-forming member extends generally transversely downwardly from the bottom of the housing where it forms a grip for holding the camera during the operation thereof, said handle-forming member having an aperture therein through which the fingers of the user's hand can be passed for carrying the camera when said handle-forming member is in said inoperative position, and a shutter and film feeding control member operable by the hand of the user while the handle-forming member is held in the palm of the user's hand while in said operative position.

2. The movie camera of claim 1 provided with releasable means for automatically locking said handle-forming member in said inoperative and operative positions as it is moved into these positions, and wherein the center of gravity of the camera when held in a horizontal position with said handle-forming member in said operative position is located along a vertical line extending through said handle-forming member.

3. The movie camera of claim 1 wherein said handle-forming member is a U-shaped member in all of its positions, it being in an up-side-down position when in said inoperative position, and is pivotable approximately 180 degrees in its movement between said operative and inoperative positions.

4. The movie camera of claim 1 which is provided with a lens opening control circuit including a meter movement spring urged into an extreme position and which meter movement controls the lens opening of said lens assembly, said control circuit further having a light responsive cell which energizes said meter movement in accordance with the amount of ambient light, and switch means for de-energizing said circuit to cause said spring urged meter movement to move to said extreme position when said handle-forming member is in said inoperative position and for effecting the energization of said circuit when said handle-forming member is in said operative position.

5. The movie camera of claim 4 wherein said switch means includes a depressible member which is engaged by said handle-forming member in one of said positions thereof.

6. The movie camera of claim 1 wherein said control member is fixedly mounted on the bottom of the camera housing in front of said handle-forming member in a position relative thereto where the index finger of the hand grasping said handle-forming member when in said operative position extends generally horizontally as the handle-forming member and control member are gripped in the same fashion as the handle and trigger of a pistol is grasped.

7. In combination, a movie camera including a housing with a front end having a camera lens assembly oriented with its axis extending forwardly of the housing and a handle-forming member pivotally mounted on the housing mounted for movement between an inoperative position at the rear of the housing where the handle-forming member projects rearwardly of the housing where it can be grasped for carrying the same when the camera is not in use and an operative position where the handle-forming member extends generally transversely downwardly from the bottom of the housing where it forms a grip for holding the camera during the operation thereof, and a shutter and film feeding control member operable by the hand of the user while the handle-forming member is held in the palm of the user's hand while in said operative position; and a holster-like casing having an opening at the top thereof for receiving the camera, said camera housing being supported within said holster-like casing with the normally front end portion of the same pointed downwardly, and said handle-forming member being in said inoperative position and projecting upwardly at the top of the casing where the user can readily grasp the handle-forming member by passing his hand through said aperture therein and lifting the camera out of the holster-like casing.

8. The combination of claim 7 wherein said handle-forming member has an aperture therein through which the fingers of the user's hand can be passed for carrying the camera when said handle-forming member is in said inoperative position.

9. The combination of claim 7 wherein said holster-like casing has a strap which is secured to one side of the holster-like casing which passes through said aperture in said handle-forming member and releasably engages the other side of the casing to hold the camera in said casing.

References Cited

UNITED STATES PATENTS

| | | | |
|---|---|---|---|
| 1,925,694 | 9/1933 | Hawkins | 150—52.8 |
| 3,240,143 | 3/1966 | Koeber | 95—86 |
| 3,242,840 | 3/1966 | Kremp et al. | 95—86 |

FOREIGN PATENTS

| | | |
|---|---|---|
| 1,123,193 | 2/1962 | Germany. |

NORTON ANSHER, Primary Examiner

A. MATHEWS, Assistant Examiner

U.S. Cl. X.R.

150—52.8; 224—26; 352—243